US006405326B1

(12) United States Patent
Azagury et al.

(10) Patent No.: US 6,405,326 B1
(45) Date of Patent: Jun. 11, 2002

(54) TIMING RELATED BUG DETECTOR METHOD FOR DETECTING DATA RACES

(75) Inventors: Alan C. Azagury, Nesher; Michael Factor, Haifa; Eltan Farchi, Pardes-Hanna; Varam Talmor, Kiryat Motzkin, all of (IL)

(73) Assignee: International Business Machines Corporation Limited, Armonk, NY (US)

( * ) Notice: Subject to any disclaimer, the term of this patent is extended or adjusted under 35 U.S.C. 154(b) by 0 days.

(21) Appl. No.: 09/327,379

(22) Filed: Jun. 8, 1999

(51) Int. Cl.$^7$ ............................................. G06F 9/455
(52) U.S. Cl. ............................................ 714/38; 717/4
(58) Field of Search ............................ 714/38, 37, 11, 714/48, 25, 811, 819, 822; 712/9, 216; 717/4; 709/400, 102

(56) References Cited

U.S. PATENT DOCUMENTS

| | | | | |
|---|---|---|---|---|
| T939,010 I4 | * | 10/1975 | Bender et al. ................. | 714/38 |
| 5,138,708 A | * | 8/1992 | Vosbury et al. ............... | 714/11 |
| 5,394,547 A | * | 2/1995 | Correnti et al. ............... | 709/102 |
| 5,905,855 A | * | 5/1999 | Klaiber et al. ................ | 714/31 |
| 5,953,530 A | * | 9/1999 | Rishi et al. ................... | 714/38 |
| 6,009,269 A | * | 12/1999 | Burrows et al. ............... | 714/38 |
| 6,067,415 A | * | 5/2000 | Uchihira et al. ............... | 717/1 |
| 6,230,313 B1 | * | 5/2001 | Callahan et al. ............. | 709/106 |

OTHER PUBLICATIONS

Jong–Deok Choi, Barton P. Miller, Robert H. B. Netzer, "Techniques for debugging parallel programs with flowback analysis". Oct. 1991. ACM Transactions on Programming Languages and Systems (TOPLAS). vol. 13 Issue 4, pp. 491–530.*

Suresh K. Damodaran–Kamal, Joan M. Francioni, "Testing races in parallel programs with an OtOt strategy". Aug. 1994. Proceedings of the 1994 international symposium on Software testing and analysis. pp. 216–227.*

Perry A. Emrath, David A. Padua, "Automatic detection of nondeterminacy in parallel programs". Nov. 1988. ACM SIGPLAN Notices, Proceedings of the ACM SIGPLAN and SIGOPS Workshop on Parallel and distributed debugging. vol. 24 Issue 1, pp. 89–99.*

Brad Richards, James R. Larus, "Protocol–based data–race detection". Aug. 1998. Proceedings of the SIGMETRICS symposium on Parallel and distributed tools. pp. 40–47.*

Assure User's Manual, Version 1.0, Kuck & Associates I$_{nc}$., (1998).

Godefroid, "Model Checking for Programming Language using VeriSoft", (Jan. 1997).

Savage et al., "Eraser: A Dynamic Data Race Detector for Multi–Threaded Programs".

Factor et al., "Timing–Dependent Bugs", pp. 1–11, (1998).

* cited by examiner

Primary Examiner—Robert Beausoleil
Assistant Examiner—Gabriel L. Chu
(74) Attorney, Agent, or Firm—Browdy and Neimark

(57) ABSTRACT

A computer system running under the control of an OS having a scheduler. The computer system includes a multi-threaded computer program that is partitioned into structures of which some are parallel. There is provided a Time-Related-Bug-Detector (TRBD) method for detecting data races between parallel structures in respect of common memory structures. The method includes performing the steps of coupling a private scheduler to the OS. Thereafter, running the program in few cycles and, during each cycle of program run, the private scheduler synchronizing the structures according to a specific interleaving of a partial order. For each cycle logging the results of the program, until every possible interleaving of the partial order has been tested. Thereafter, comparing the results, and in the case that they are identical indicating that said program is race free in a give degree of confidence, otherwise indicating that the program is susceptible to a data race in respect to a common memory.

14 Claims, 2 Drawing Sheets

TIMING RELATED BUG DETECTOR METHOD FOR DETECTING DATA RACES

FIELD OF THE INVENTION

The present invention is in the general field of timing related bug detectors which aim at detecting data races in multi-threaded computer programs applications.

BACKGROUND OF THE INVENTION

A general computer program is a list of statements, instructions, and commands to be executed properly and in a well ordered fashion. The operating system (OS hereafter) is the computer software that manages all the activities taking place in the computer. The OS is responsible to run the program on the computer.

The task of the computer program is the results it generates during its execution.

The computer may have more than one processor available to fulfill the OS needs and requirements. The OS might allocate more than one processor to execute a given program. If one processor is allocated to run the program, then the program's instructions are executed one-by-one in a well ordered fashion to generate the expected results. This sequential run of the program generates the sequential results, which are the results that are designed to be generated by the program. The order the program's instructions are executed in the sequential run is the sequential order of the program's instructions. A computer program may be split into several structures each consisting of several instructions of the computer program. Each of the program's structures usually, but not necessarily, have a well defined task.

In general, a program can be described as a set of structures, along with their respective relationships and interconnections. In addition, due to the nature of these interconnections, a program can be also described as a hierarchy of several levels. In this case, the program set of structures, is distributed over these levels, where each structure is connected to one or more of the structures located in the level above it. This hierarchy is defined by the order that these structures are to be executed. FIG. 1A illustrates a naive example of hierarchical program (90) where each level consists of one structure and FIG. 1B illustrates another, more complex, hierarchical program (20) where level (22) contains two parallel structures (A (24) and B (26)), and level (28) which contains two parallel levels (C (30) and D (32)).

A general computer program may contain two or more parallel structures, as is exemplified in FIG. 1B. In the more general case, a program's structure may include several levels each containing two or more parallel structures.

A thread is a sequence of structures that are to be executed one after the other in a sequential fashion. Thus, a thread may consist of a sequence of structures that belong to consecutive levels in the hierarchy, and which are connected to each other. The results that are generated during the execution of this well ordered sequence of a program's structures are the thread's results. Reverting now to FIG. 1A, the program consists of only one thread starting with a first structure called begin (12), and its last structure is the end structure (14) of the program. This thread is called a total thread seeing that it concerns only one total order.

In the other example of FIG. 1B, the program has two different threads {A, C} and {B, D}. A thread is a program segment defined to execute as a 'light' program, with its own local variables, possibly, but not necessarily, on a different processor. Thus, if a partition of the structures is given, a thread is an assignment of each partition structure to a processor. The partition should meet the requirement that its structures can be ordered in an order that does not contradict the order that is defined by the hierarchy. For example, with reference to FIG. 1B {A, C} and {B, D} is an adequate partition considering that A→C and B→D do not contradict the hierarchy of FIG. 1B, and accordingly the assignment of {A, C} to a first processor and {B, D} to a second processor is feasible.

In addition to the fact that the thread consists of several structures executed one after the other, the thread is also associated with a well defined memory domain. A cell is the smallest unit of the memory that the computer program refers to. The thread's memory domain is the part of the computer memory, which the thread writes to and/or reads to data.

Therefore, a thread is defined by the following three major components:

(1) The sequence order of thread's structures
(2) The thread's memory domain. This memory domain or parts of it may be used also by other threads
(3) The output domain where the thread writes its relevant results. The output domain is never used in a "read mode"

The thread's execution trace is a list of all its sequential structures' instructions that where executed during its full execution. Similarly, the program's execution trace is a list of all the program instructions that where executed during its full execution of the program. Here, each instruction is accompanied by:

(1) The appropriate time that it was executed (statement's execution time stamp)
(2) The ID of the thread that has executed this instruction, and
(3) The map of each of the thread's memory domain at each of the time stamps.

Part of the program's execution trace is the memory trace, which is the list of the memory maps, each taken in a different time, ordered sequentially.

In case the program contains at one of its points N parallel structures, then it can be split into at most N parallel threads. Therefore if a multi-processors computer is available to execute this program, then the OS can allocate each of the parallel threads to a different processor. Alternatively, in the case of single processor architecture, the OS can simulate the allocation of threads to respective processors.

Two parallel threads are connected to each other if parts of the memory domains overlap. These parts make-up the two-threads overlap memory domain or common memory. At a specific memory cell that belongs to the overlap memory domain of two threads, the following scenarios might happened:

(1) both threads write into this cell
(2) one writes into the cell and the other reads information out of it
(3) both read data from this memory cell A data race between two parallel threads is the situation where the two threads are connected and both contain scenario (1) and/or scenario (2) on their overlap common memory. In this case, the two parallel threads compete, regardless of whether they are implemented in a single-processor or multi-processor architecture.

A competing point of two competing threads is the memory cell which belongs to their overlap memory domain and there is a data race on this cell. Two threads may have more then one competing point. For example, assume that structures A and B in FIG. 1B belong to two connected threads, TA and TB respectively. In case of scenario (1) if TA reads and TB writes to the same competing point, then TA can get the value of the contents of the competing point either before or after TB wrote values into this common cell, depends on the order of execution. Thus, when terminated, TA might contain different values at its memory domain for the different cases that might take place.

When parallel structures are allocated to different parallel processors, and if no synchronization exists, the parallel processors can start and end the execution of their allocated structures in some undetermined time, giving rise to different possible interleavings among the parallel structures and consequently to parallel threads. In the case that the parallel threads compete, the results of one or more of the threads may be different than that of sequential program results which is obviously undesired. Thus, in general, the existence of a competing point in a multi-threaded parallel program is a source for inconsistency in its results. Depending on the computer's OS's activities taking place at the same time that the program is executed, different results can be obtained for different runs of the program. Therefore, by using appropriate system mechanisms, usually known as synchronization calls, the connected threads can be synchronized at each relevant competing point. The synchronization calls sometimes implemented as library calls and sometimes implemented as programming language primitives (as is the case in the Java language).

Based on this, the data race occurs when parallel structures are not synchronized, leading to results which depend on the schedule that the OS executes these parallel structures, or on the schedule the OS activates the processors that execute their associated structures.

Two different runs of two connected threads are equivalent if their two respective memory traces are identical. The execution of a program is unique if all its connected threads are equivalent to each other, and, of course equivalent to the sequential result of the program.

If the two runs of a program, that use the same input, give rise to different results, then the program has a data race in respect to at least one of its competing points, and one of the following conclusions holds true:

neither of the results is the correct one one of the results is the correct one, and it is not known which one it is it is not known, in general, which thread gave rise to what result as the trace can be in a different abstraction level.

All the results are correct, as the race might be intentional, e.g., in order to improve performance.

A sync control is an OS synchronization service used to enforce order among competing structures (or portion thereof). A sync service is applied to the entire structure (i.e., a series of instructions) or to a sub set of the specified set of instructions including the specific case of only one instruction. The sync service synchronizes the connected structures and includes, as a rule, two basic controls lock and unlock. Whenever the OS for the benefit of a given thread locks a memory cell, then any other thread that needs access to the memory cell is put on hold till the OS unlocks this seizing of the cell by this thread. After unlocking this cell it will lock it again for the benefit of another thread. The processes of locking and unlocking memory cells by the OS are well defined to the OS before the program starts its execution.

The sync control is seemingly the ideal solution which copes with the possible inconsistencies in a multi-thread computer program as it synchronizes the connected structures and imposes a predefined sequential order which brings about one result.

Regretfully, in a multi-threaded computer program it is quite common that even a proficient programmer/developer, will fail to identify all existing racing points and consequently will fail to introduce the appropriate sync controls in the program. As specified above, this may lead to an interleaving sequence or sequences that bring about inconsistent results which are different that those anticipated by the programmer. Normally, the larger the level of parallelism (number of interleaving) the higher the prospects for obtaining inconsistent results (This situation is referred to also as time related (TR) bugs). Obtaining inconsistent results in succession runs of a computer program may lead to dire consequences in a multi-threaded computer program applications incorporated in, say, military oriented applications or medical related applications (e.g., a computer application which monitors the operation of medical equipment for intensive care purposes.

Various solutions have been proposed in accordance with the prior art in order to cope with the inconsistent results obtained in running a multi-threaded program. The most straight-forward approach is to conduct so called "stress tests" where the program under test is constrained to operate in varying operational conditions and the program's execution trace and/or results are logged and compared. In the case of discrepancy between two or more runs, one can assume that data race has been encountered at least in respect of one memory cell. This naive approach has some significant limitations. For one, even if data race is encountered, it is difficult to identify the specific interleaving which gave rise to the defective result, since no data is provided as to the exact scheduling order of the structures to the parallel processors by the OS. Moreover, regardless of whether data race has been encountered or not, it is not guaranteed that even under very demanding stress test all possible interleavings for a given partial order occur. This being the case, the stress test can never be regarded as sufficiently reliable considering that those interleavings which were not encountered may lead to the inconsistent results. It should be noted that partial order is normally determined by the input (i.e. different partial orders may be defined by respective different inputs).

In Assure™ (Assure is a trademark of Kuck & Associates, Inc.) User's Manual Version 1.0, Document #9801002, it was suggested to monitor the entire memory and intercept any data read (R) and data write (W) to a memory cell. Any read/write conflict that is encountered is analyzed in order to determine whether or not there exists a data race in respect of this cell.

Reference is also made to Eraser, A Dynamic Data Race Detector for Multi-Threaded Programs by Stefan Savage, Michael Burrows, Greg Nelson, Patrick Sobalvarro, Thomas Andersen.

The most obvious shortcoming of the specified techniques is that every access to the memory is analyzed, posing thus undue overhead considering that only few memory cells may indeed be subject to a data race. Moreover, even if a given memory cell is subject to a data race, it is required to ascertain whether the "suspected" memory cell is or is not in a scope of a sync control command. If in the affirmative (i.e., it is within the scope of a sync command), then it does not constitute a competing memory cell. For a better understanding of the foregoing, consider the following sequence of instruction:

```
F( )
{
lock( )
h( )
}
h( )
{
l( )
}
l( )
{
X=3
}
```

As shown, function f( ) call function (h) which is synchronized by a lock( ) synchronization command. h( ) in its turn calls function l( ), in which the variable X is assigned with the value 3. Since X resides (indirectly) in the scope of the synchronized function h( ), it may not constitute a competing cell. However, according to the specified techniques, the test is triggered only when the variable X is accessed (i.e., when the command X=3 is executed). At this stage, according to the prior art techniques, it is very difficult and time consuming to realize that there is no need to check X (for determining whether or nor it is subject to data race) considering that X (i.e., memory cell being representative of X) is under a scope of a lock( ) synchronization command.

There are known in the art formal verification techniques (refer to, e.g., 'Model Checking for Programming Languages Using VeriSoft' by Patrice Godefroid). This category of tools can apply formal methods to verify properties of concurrent programs, such as race conditions. Experience shows that they are only applicable to relatively small software applications.

There is accordingly a need in the art for providing testing tools and appropriated methodologies to help increase the confidence that a program is free of timing related (TR) bugs that stem from data races in respect of common memory.

GENERAL DESCRIPTION OF THE INVENTION

The invention aims at providing an automatic detection tool for detecting TR bugs, i.e. Time Related Bug detector (hereafter TRBD), which is a new concurrent testing tool for testing the concurrent aspects of a multi-threading program (hereafter MTP).

The TRBD provides sufficient confidence in the program correctness in terms of TR bugs that related to unexpected data races.

According to a first aspect of the invention, there is provided a multi-threaded computer program partitioned into structures of which at least one structure is parallel to at least one other structure. The multi-threaded computer program is executed in a multi or single processor environment under the control of an OS which utilizes a scheduler (optionally replaceable scheduler).

Preferably, the TRBD has a private scheduler that partially or fully replaces the OS scheduler.

The TRBD runs the program successively and during each cycle the private scheduler synchronizes the structures according to a given partial order. Thus, in a first run cycle a given interleaving is implemented that meets a given partial order. In the next run cycle, a different interleaving is implemented that meets the same partial order. This procedure of successively running the program is continued until all the intrerleavings that meet the specified partial order are covered and results are obtained in respect of each separate run.

The TRBD has a mechanism to verify discrepancies between the so obtained results. In the case that all the results are identical for the same input this indicates in a high degree of confidence that the computer program is data race free. If, on the other hand, there appears to be a discrepancy between one (or possibly more than one) of the results obtained in a given cycle (or cycles) as compared to other result(s), this not only indicates on the fact there exists a data race, but also on the specific interleaving which gave rise to the defective results.

Those versed in the art will readily appreciate that an underlying premise of the invention is that different results obtained in two interleavings of the same partial order indicates, with a high degree of confidence, that there exists a race. As will be explained in greater detail below, in the specific case of Java™ (Java is a trademark of Sun Microsystems) in order to meet the specified underlying premise, the interleavings of a given partial order that are subjected to the method step of the invention are a priori selected so that they meet the so called release consistency requirement. Put differently, in Java, had one or more of the interleavings (of a given partial order) that are subject to the technique of the invention not met the release consistency requirement, and assuming that different results are obtained for different interleavings, this would not necessarily indicate a race condition.

The indication on the relevant interleaving that is associated with a given result which is suspected to result from a run where data race occurred, assists the programmer/developer in identifying the common memory cell or cells which are subject to competition (and which were overlooked by the programmer when he/she incorporated sync commands in the program), and thereby render the computer program "race free" in a higher degree of confidence.

It should be noted that in many real-time applications programmers tend to limit the use of sync commands only to those cases where they consider it absolutely necessary in order to optimize the program performance. This optimizing approach is risky since one or more program sections which necessitate synchronization may be overlooked. The TRBD tool of the invention may be employed in order to overcome or substantially reduce this limitation. Thus, for example, in the case of a Java program the programmer may utilize the TRBD tool of the invention for accomplishing program optimization. In the case of inconsistent results (which suggest that a race has been encountered,) the programmer can modify the program by moving the acquire and/or release sync commands a (that correspond to the specified lock and unlock commands) few program statements forward or backward and repeatedly use the tool until TR-free program is obtained. Accordingly, a repeated use of the tool on the corrected program helps to check if the optimization is correct.

There are various known per se techniques which may be utilized to compare between the results obtain in different cycles.

Accordingly, the present invention provides for, in a computer system running under the control of an OS having a scheduler; the computer system further includes a multi-threaded computer program that is partitioned into structures of which at least one structure is parallel to at least one other structure, a Time-Related-Bug-Detector (TRBD) method for detecting data races between parallel structures in respect of common memory structures, comprising:

(a) coupling a private scheduler to the OS;
(b) running the program in few cycles and, during each cycle of program run, the private scheduler synchronizing the structures according to a respective interleaving of a partial order and for each cycle logging the respective full or partial results of the program, until substantially every possible interleaving of said partial order has been tested;
(c) comparing the results, and in the case that they are identical indicating that said program is race free in a degree of confidence, otherwise indicating that said program is susceptible to at least one data race in respect to a common memory.

In the context of the invention, a first structure is parallel to a second structure if the former commences execution before the latter terminates execution or vise versa. Common memory should be construed as any memory unit including but not limited to the smallest memory unit (e.g. a given memory address, or memory cell) which is accessible to the processor. Memory should be construed as any physical storage medium.

Computer program should be construed as encompassing any computer code (and its associated data) adapted to be executed on processor (multi-threaded environment on a single processor) or processors, regardless of the physical arrangement of the code.

The term results refers typically (although not necessarily) to the input-output relation (i.e. outputs obtained for given input), or to the program's execution trace after so called conditional switch (see below), which the case may be.

By one embodiment, the private scheduler is implemented in accordance with the concurrent testing tool, see "Timing-Dependent Bugs", by Michael Factor, Eitan Farchi and Yoram Talmor, published in Software Testing Analysis and Review CD, 1998. (referred to herein also as king scheduler).

The operation of a TRBD system or method in accordance with the first aspect of the invention requires the obtainment of a partial or full set of results (i.e. output-input relation) in response to running respective interleavings of the same partial order of the computer program. It should be noted in this connection that, generally, a given partial order is determined by the input that is fed to the computer program. In other words, different inputs may give rise to different partial orders.

In some real life applications, it is difficult to obtain and log results, or, alternatively, even if results (or partial results) are obtained it is difficult to determine the difference between them. A non-limiting example of the latter is a graphic user interface (GUI) application where the "result" of the program is portrayed on the screen and it is difficult to indicate the differences between the screens generated by respective different runs of the computer program application.

In accordance with a second aspect of the invention and similar to the first aspect, the Time-Related-Bug-Detector (TRBD) system and method synchronizes the structures in the manner specified. Thus, instead of analyzing the output-input results (in the sense specified above) of the computer program application in respective different runs (interleavings), the program's execution trace (constituting also "results") after so called conditional switch points is logged and compared to the trace obtained in successive (and previous) runs that meet the same partial order. In the case that the trace is consistent in respect of all the switch points in each one of the interleavings, then the program is data race free in a high degree of confidence. Otherwise, there exists a data race.

Conditional switch point, in this context, is any instruction in the program where a condition is tested and the program switches to an execution of a command depending upon the result of the condition. Typical, yet not exclusive, examples of conditional switch points (in the C++ programming language) are if statements, do while statements and others.

Accordingly by this aspect the invention provides for: in a computer system running under the control of an OS having a scheduler; the computer system further includes a multi-threaded computer program that is partitioned into structures of which at least one structure is parallel to at least one other structure, the program includes at least one conditional switching command where the program tests a condition and switches to a different target location depending upon the result of said condition, a Time-Related-Bug-Detector (TRBD) method for detecting data races between parallel structures in respect of common memory structures, comprising:
(a) coupling a private scheduler to the OS;
(b) running the program a few times and, during each cycle of program run, the private scheduler synchronizing the structures according to a respective interleaving of a partial order and for each cycle logging the at least one target location that the program switches to in response to the execution of the at least one conditional switching command, until substantially every possible interleaving of a partial order has been tested;
(c) comparing the target locations obtained in the cycles of executions and in the case that they are identical indicating that said program is race free in a degree of confidence, otherwise indicating that said program is susceptible to at least one data race in respect to a common memory.

Still further, the invention provides for a storage medium storing at least one computer file holding data being representative of a Time-Related-Bug-Detector (TRBD) computer program that can be applied to a multi-threaded computer program which is partitionable into structures of which at least one structure; the (TRBD) computer program is capable of detecting data races between parallel structures in respect of common memory structures, by executing the steps that include:
(a) coupling a private scheduler to an Operating System;
(b) running in a computer system the multi-threaded program in a few cycles and, during each cycle of program run, the private scheduler synchronizing the structures according to a respective interleaving of a partial order and for each cycle logging the respective full or partial results of the multi-threaded program, until substantially every possible interleaving of the partial order has been tested;
(c) comparing the results, and in the case that they are identical indicating that said multi-threaded program is race free in a degree of confidence, otherwise indicating that said program is susceptible to at least one data race in respect to a common memory.

BRIEF DESCRIPTION OF THE DRAWINGS

For a better understanding, the invention will now be described by way of example only, with reference to the accompanying drawings in which.

DETAILED DESCRIPTION OF PREFERRED EMBODIMENTS

Figures 1A, 1B:
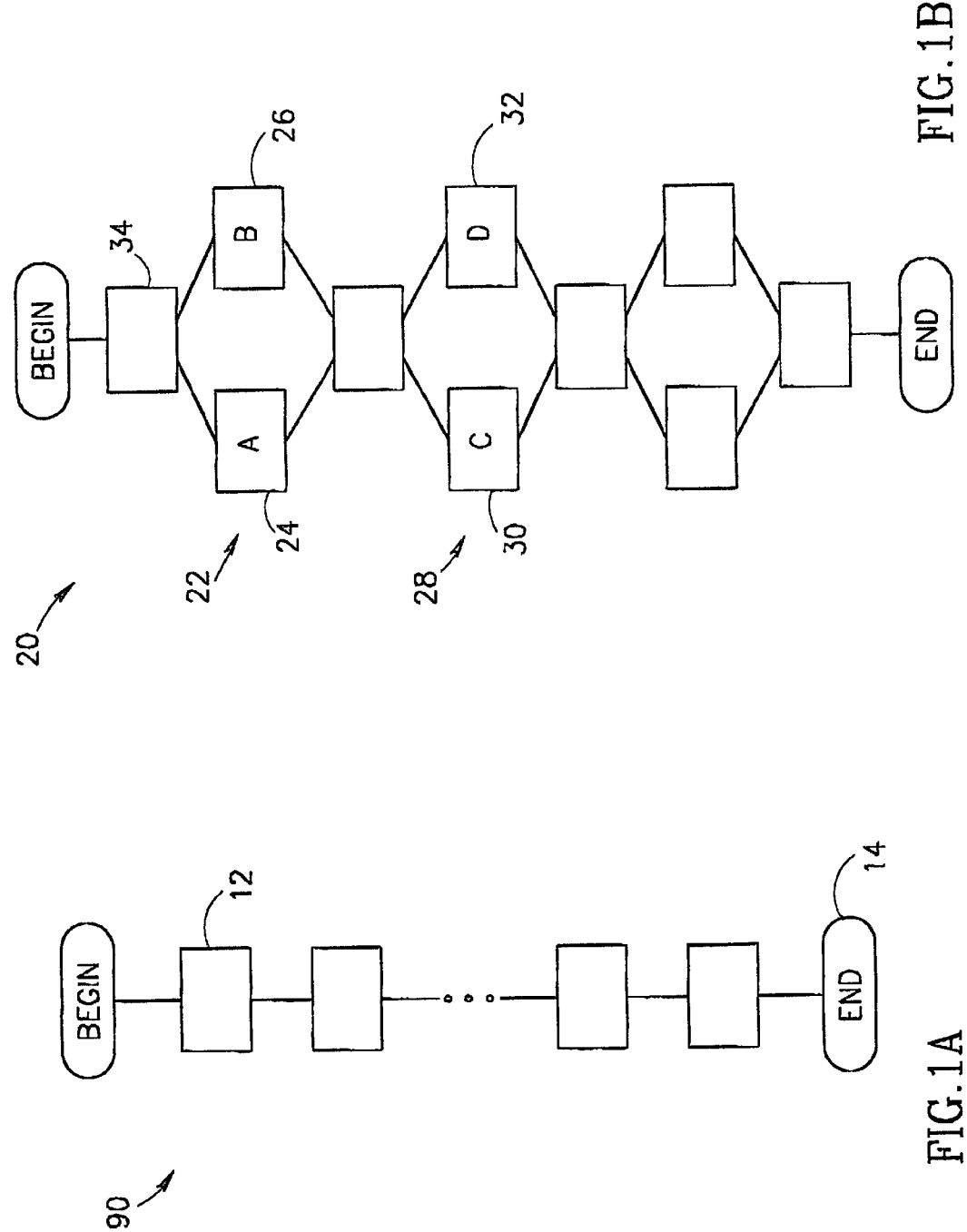
FIGS. 1A–B illustrate schematically a single thread and multi-thread computer program applications.
Figure 2:
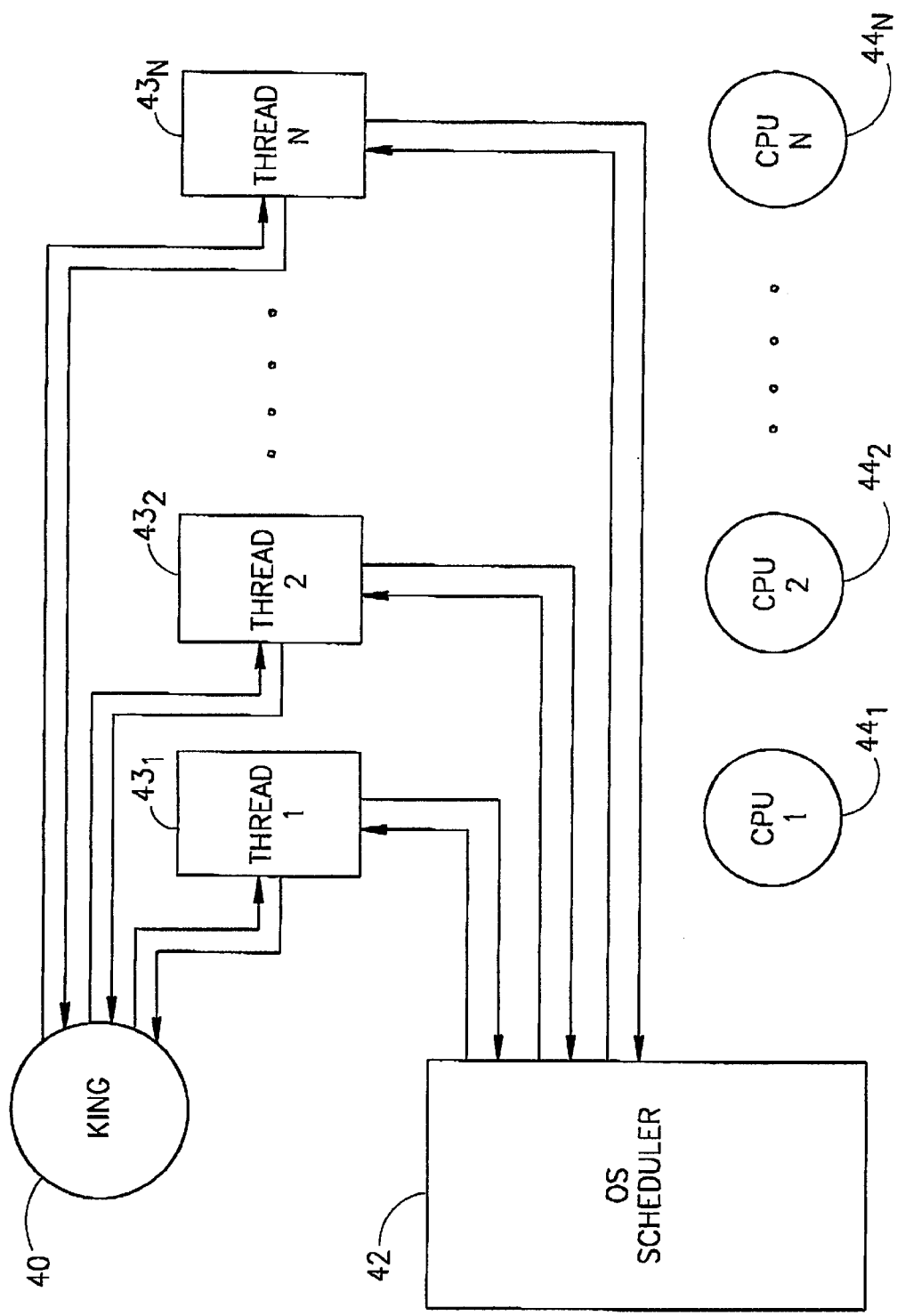
FIG. 2 illustrates a generalized Time Related Bug Detector (TRBD) system in accordance with one embodiment of the invention.

For exemplifying the operation of the TRBD system and method of the invention, attention is directed to FIGS. 1B and 2. It should be noted that the invention is described with reference to a specific implementation utilizing the specified King architecture. The invention is by no means bound by this specific example.

Thus, according to one embodiment of the invention, there is provided a multi-threaded computer program (20 in FIG. 1A) partitioned into structures of which A (24) is to B (26) and C (30) is parallel to B (32). The computer program is executed, by this particular embodiment, in a multi-processor environment under the control of an OS having replaceable scheduler. It should be noted that the partitioned structures are is usually (although not necessarily) determined from the language constructor (e.g., thread object in JAVA™—Java is a trademark of Sun Microsystem)

As shown in FIG. 2, the TRBD has a private King scheduler (40) that partially replaces the OS scheduler (42). The King scheduler (40) and the OS (42) are coupled to the various threads (designated as thread1 $43_1$ to threadn $43_n$). Each thread is executed on respective processor $44_1$ to $44_n$. As recalled, by the specific example of FIG. 1B, there are two separate threads (A,C) and (B,D). The specific partial order of FIG. 2 is determined by a given input (selected for example from the test suite) and stipulates that (A,B) are processed before (C,D). The partial order under test enables, however, the execution of structures B and A in any possible order, and thereafter executes structures C and D in any possible order, bringing about four possible interleavings (A,B,C,D) (B,A,C,D) (A,B,D,C) and (B,A,D,C) for the same partial order. Thus, after structure (34) is executed, the king, acting as the private scheduler, is called for scheduling the first interleaving (A B C D). At the onset, the king scheduler "releases" A structure for execution by processor ($44_1$) and seizes B from execution by processor ($44_2$). After A completes execution it calls the king scheduler which now releases B for execution by processor ($44_2$). Now after B completes, it calls the king which releases C for execution in processor ($44_1$) (whilst seizing D). Thereafter, D is called for execution in processor ($44_2$). The results of these run are logged (and associated to the specified A B C D interleaving).

Next, the procedure is repeated for implementing the (B, A, C, D) interleaving and the results are also logged. After implementing in the same manner the interleavings (A B D C) and (B A D C), all possible interleavings of the specified partial order were implemented and what remains to be done is to compare, in a known per se manner, the results obtained in the runs. In the case of identical results, this indicates that the program is race free in a high degree of confidence. Otherwise, there exists a race.

In order to verify that there is no race the specified procedure should be repeated for preferably each of the inputs of the test suite. The more inputs that are tested the higher is the confidence level that the program is race free.

In this connection it should be noted that one common scenario in which the TRBD is used is when a given black box test suite exists. A black box test suite consists of tests that test the program outward behavior, possibly its input-output relationship. Such black box test suites commonly represent some notion of test completeness or coverage when only the outwardly behavior of the program is considered. Usually, such test suites do not test the concurrent aspects of the program. For each test in the black box test suite, a partial order is defined for the program. Utilizing the tool of the invention, in the context of test suites brings about the following advantages:

Current test suites can be enhanced to eliminate race conditions bearing the mere penalty of excessive computation time;

A natural notion of test completeness is introduced. If the black box test suite meets the black box coverage criteria, the following coverage criterion is introduced: obtain a set of tests that meet the black box coverage criteria; each such test defines a partial order; Execute each test while running all possible interleavings that meet the partial order that the test defines. When this is done the coverage criterion is met.

As specified above, insofar as some applications are concerned in order to guarantee that different results indeed indicate that there exists a data race a pre-requisite condition should be met. Thus, for Java™ application, a partial order is determined, according to a given input from the test suite, and thereafter the interleavings of the partial order that are subject to the test of the tool of the invention should meet the release consistency pre-requisite. A reference on the relation between the Java programming language and the release consistency can be found in 'Java consistency: Non-operation Characterizations for Java memory Behavior' by Alex Gontmakher and Assaf Schuster.

Reverting now to the example of FIG. 1B, consider a scenario where B A C D gave rise to results different than the others. This indicates that a data race occurred. The programmer/developer, being aware of the interleaving (i.e., B A C D) that lead to the defective result, is capable of identifying the common memory cell or cells which are subject to competition, and after duly fixing the time related bug, the computer program is rendered race free in a higher degree of confidence.

Of course, in order to verify reliable "race" or "race-free" state the so obtained results are assumed to be of repeatable nature. Put differently, any repetition of the same interleaving (say B A C D) should bring about the same result.

The advantages obtained by utilizing the proposed technique of the invention over hitherto known techniques include:

every test element in a given test suite defined by the user of the tool of the invention implicitly defines a partial order. All partial orders defined by the test suite are covered by the tool, thus defining a coverage notion.

spurious alarms (i.e., memory cells which are seemingly subject to data race) of the kind exhibited in Eraser are avoided.

In accordance with another embodiment of the invention which is applications in particular (but not necessarily) in applications where it is difficult to log, analyze and/or compare results (such as applications which generate GUI), a modified embodiment of the invention is utilized.

Thus, instead of analyzing the output results (or partial results) for a given input (output-input relations) of the computer program application in respective different runs, the execution trace (constituting "results") of the computer program application in particular after conditional switch points is logged and compared to traces obtained by running the computer program application according to another interleavings that meet the same partial order. In the case that the behavior is consistent in respect of all the switch points in each one of the interleavings that meets the same partial order, then the program is data race free in a high degree of confidence. Otherwise, there exists a data race.

Consider, for example, the following if statement structure (in the C language):

```
A
B
If (i=1) then
{
    f( )
} else
{
    g( )
}
```

If the condition i=1 is met, the program switches to target location for executing f. If, on the other hand, the condition is not met, the program switches to a different target location where the else statement g is executed.

Focusing now on the structures A and B in the above exemplary code, then it is submitted that if A and B are not competing in respect of the memory cell i, then the behavior (execution trace) of the program in the switching points will be the same regardless of whether the sequences AB or BA are performed. Put differently, in both cases (i.e., running AB or running BA before the if statement), the program will switch to the same target location.

Reverting now to the execution of the program according to this modified embodiment, the program is executed under the control of the private scheduler king in the manner described above so as to implement all possible interleavings of the same partial order. In every cycle of execution, the execution trace of the program (at least in all the switching points) is logged, using known per se automatic instrumentation.

Now, the target locations in each run are compared to the target locations obtained in the other runs and if they are identical it indicates that the program is race free in a high degree of confidence; otherwise, there exists race in respect of at least one memory cell. Identical locations, in this context, mean that the target locations of run #1 (in respect to a first interleaving of a partial order) are the same as those obtained in run #2 (in respect to a second interleaving of the same partial order) and so forth for the rest of the interleavings of the same partial order.

The interleaving that is associated with the "suspected run" as well as the logged discrepancy (say the different trace occurred in only one switching point) may direct the programmer/developer to detect the source of inconsistency and after fixing it render the program race free in a high degree of confidence.

In the following claims, letters, numbers and symbols are used for convenience only and do not necessarily imply on any order of the claim steps.

In the description and drawings, there has been set forth a preferred embodiment of the invention, and although specific terms are used, the description thus given uses terminology in a generic and descriptive sense only and not for purpose of limitation.

What is claimed is:

1. In a computer system running under the control of an OS having a scheduler; the computer system further includes a multi-threaded computer program that is partitioned into structures of which at least one structure is parallel to at least one other structure, a Time-Related-Bug-Detector (TRBD) method for detecting data races between parallel structures in respect of common memory structures, comprising:

(a) coupling a private scheduler to the OS;
(b) running a few cycle of the program in few cycles and, during each cycle of program run, the private scheduler synchronizing the structures according to a respective interleaving of a partial order and for each cycle logging the respective full or partial results of the program, until substantially every possible interleaving of said partial order has been tested;
(c) comparing the results, and in the case that they are identical indicating that said program is race free in a degree of confidence, otherwise indicating that said program is susceptible to at least one data race in respect to a common memory.

2. The method of claim 1, wherein said step (c) further includes, in the case of data race, indicating the pertinent interleaving of the partial order.

3. The method according to claim 1, wherein said private scheduler is implemented by utilizing a king scheduler.

4. The method according to claim 1, wherein said OS's scheduler being replaceable.

5. The method according to claim 1, wherein said computer system includes multi-processors for running said multi-threaded computer program.

6. The method according to claim 1, wherein said computer system includes a single processor for running said multi-threaded computer program.

7. The method according to claim 1, further comprising the step of:

repeating said step (b) for partial orders defined by respective inputs of a test suite; said step (c) further includes:
for each of said partial orders comparing the results of its corresponding interleavings, and in the case that they are identical indicating that said program is race free in a high degree of confidence, otherwise indicating that said program is susceptible to at least one data race in respect to a common memory.

8. The method of claim 1, wherein said results being input-output relationship.

9. The method of claim 1, wherein said results being results of conditional switches.

10. In a computer system running under the control of an OS having a scheduler; the computer system further includes a multi-threaded computer program that is partitioned into structures of which at least one structure is parallel to at least one other structure, the program includes at least one conditional switching command where the program tests a condition and switches to a different target location depending upon the result of said condition, a Time-Related-Bug-Detector (TRBD) method for detecting data races between parallel structures in respect of common memory structures, comprising:

(a) coupling a private scheduler to the OS;
(b) running the program a few times and, during each cycle of program run, the private scheduler synchronizing the structures according to a respective interleaving of a partial order and for each cycle logging any target locations that the program switches to in response to the execution of conditional switching commands, until substantially every possible interleaving of a partial order has been tested;
(c) comparing the target locations obtained in the cycles of executions and in the case that they are identical indicating that said program is race free in a degree of confidence, otherwise indicating that said program is susceptible to at least one data race in respect to a common memory.

11. A computer readable storage medium storing at least one computer file holding data being representative of a Time-Related-Bug-Detector (TRBD) computer program executable by a computer that can be applied to a multi-threaded computer program which is partitionable into structures of which at least one structure is parallel to at least one other structure; the (TRBD) computer program is capable of detecting data races between parallel structures in respect of common memory structures, by executing the steps that include:

(a) coupling a private scheduler to an Operating System;

(b) running, in a computer system, a few cycles of the multi-threaded program and, during each cycle of program run, the private scheduler synchronizing the structures according to a respective interleaving of a partial order and for each cycle logging the respective full or partial results of the multi-threaded program, until substantially every possible interleaving of the partial order has been tested;

(c) comparing the results, and in the case that they are identical indicating that said multi-threaded program is race free in a degree of confidence, otherwise indicating that said program is susceptible to at least one data race in respect to a common memory.

12. The computer readable storage medium of claim 11, further including:

repeating said step (b) for partial orders defined by respective inputs of a test suite; said step (c) further includes:

for each of said partial orders comparing the results of its corresponding interleavings, and in the case that they are identical indicating that said program is race free in a high degree of confidence, otherwise indicating that said program is susceptible to at least one data race in respect to a common memory.

13. The computer readable storage medium of claim 11, wherein said results being input-output relationship.

14. The computer readable storage medium of claim 11, wherein said results being results of conditional switches.

* * * * *